US012763821B2

(12) United States Patent
Venugopal et al.

(10) Patent No.: US 12,763,821 B2
(45) Date of Patent: Oct. 13, 2026

(54) CODEBOOK SUBSET RESTRICTION FOR BEAMFORMED COMMUNICATIONS

(71) Applicant: QUALCOMM Incorporated, San Diego, CA (US)

(72) Inventors: Kiran Venugopal, Green Brook, NJ (US); Wooseok Nam, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/502,345

(22) Filed: Nov. 6, 2023

(65) Prior Publication Data

US 2025/0150126 A1 May 8, 2025

(51) Int. Cl.
*H04B 7/0456* (2017.01)

(52) U.S. Cl.
CPC .................................. *H04B 7/0478* (2013.01)

(58) Field of Classification Search
CPC .................................................... H04B 7/0478
USPC ........................................................ 375/267
See application file for complete search history.

(56) References Cited

U.S. PATENT DOCUMENTS

2023/0216558 A1* 7/2023 Sun ........................ H04B 7/063 370/329
2025/0220482 A1* 7/2025 Zhang .................. H04W 24/10

FOREIGN PATENT DOCUMENTS

WO 2023108594 A1 6/2023

OTHER PUBLICATIONS

International Search Report and Written Opinion—PCT/US2024/051394—ISA/EPO—Feb. 10, 2025.
3GPP: "3rd Generation Partnership Project; Technical Specification Group Radio Access Network; NR; Physical layer procedures for data (Release 17)", 3GPP TS 38.214 V17.6.0, Jun. 2023, pp. 1-231.
3GPP: "3rd Generation Partnership Project, Technical Specification Group Radio Access Network, NR, Physical Layer Procedures for Data (Release 18)", 3GPP TS 38.214 V18.0.0, Sep. 2023, pp. 1-278.
3GPP: "3rd Generation Partnership Project, Technical Specification Group Radio Access Network, NR, Radio Resource Control (RRC) Protocol Specification, (Release 17)", 3GPP TS 38.331 V17.6.0, Sep. 2023, pp. 1-1335.

* cited by examiner

*Primary Examiner* — Lihong Yu
(74) *Attorney, Agent, or Firm* — Dinsmore & Shohl LLP

(57) ABSTRACT

Certain aspects of the present disclosure provide techniques for reporting precoding feedback with port-level conditions for beamformed communications. An example method for wireless communications by an apparatus includes obtaining a configuration indicating, for a type of port selection codebook associated with precoding matrix indicator (PMI) feedback, one or more conditions applied to one or more ports among a plurality of ports associated with the PMI feedback; obtaining one or more first reference signals; and sending a first report based on the one or more first reference signals, the first report comprising the PMI feedback, the PMI feedback being in accordance with the configuration.

30 Claims, 13 Drawing Sheets

One Frame (TDD)
10 ms
subframe
slot
RB
400 subcarrier
OFDM symbol
slot
DMRS $R_x$
CSI-RS
430
PDCCH
SSS
PSS
PDSCH
PBCH
SS/PBCH Block
20 RBs
system bandwidth RBs

450

SRS
DMRS R
SRS Comb 0
SRS Comb 1
480
PUCCH
PUSCH

802

| $k_{l,i}$ | $p_{l,i}$ |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

804

| $b_i$ | $\check{p}_i$ |
|---|---|
| 00 | 0 |
| 01 | $\sqrt{1/4}$ |
| 10 | $\sqrt{1/2}$ |
| 11 | 1 |

FIG. 8

CODEBOOK SUBSET RESTRICTION FOR BEAMFORMED COMMUNICATIONS

INTRODUCTION

Field of the Disclosure

Aspects of the present disclosure relate to wireless communications, and more particularly, to techniques for reporting precoding feedback for beamformed communications.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by an apparatus. The method includes obtaining a configuration indicating, for a type of port selection codebook associated with precoding matrix indicator (PMI) feedback, one or more conditions applied to one or more ports among a plurality of ports associated with the PMI feedback; obtaining one or more first reference signals; and sending a first report based on the one or more first reference signals, the first report comprising the PMI feedback, the PMI feedback being in accordance with the configuration.

Another aspect provides a method for wireless communications by an apparatus. The method includes sending a configuration indicating, for a type of port selection codebook associated with PMI feedback, one or more conditions applied to one or more ports among a plurality of ports associated with the PMI feedback; sending one or more first reference signals; and obtaining a first report based on the one or more first reference signals, the first report comprising the PMI feedback, the PMI feedback being in accordance with the configuration.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 8 illustrates example mappings of amplitude coefficients used for precoding feedback.

DETAILED DESCRIPTION

Figure 1:
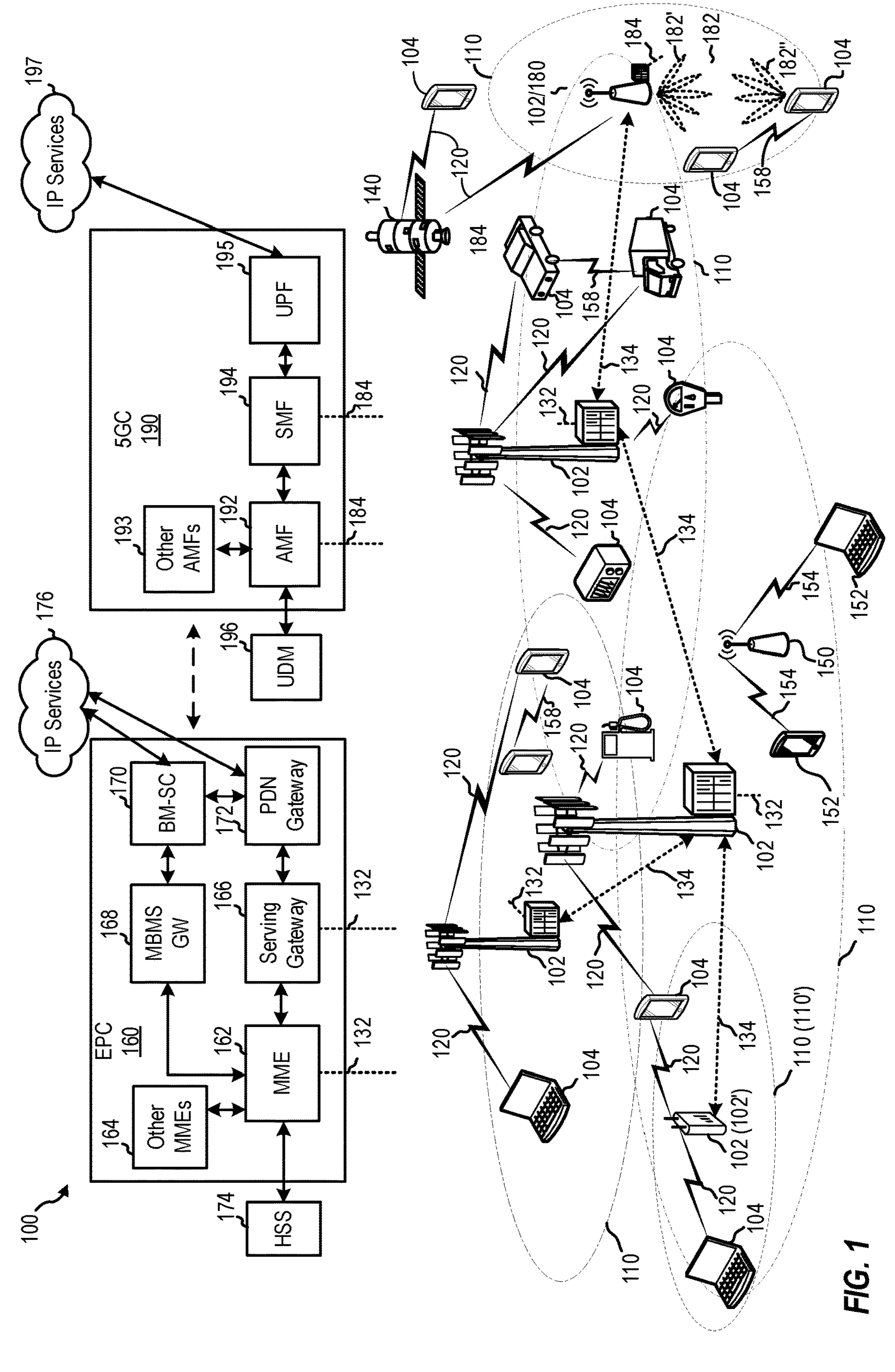
FIG. 1 depicts an example wireless communications network.

Aspects of the present disclosure provide apparatuses, methods, processing systems, and computer-readable mediums for reporting precoding feedback with port-level conditions for beamformed communications.

In certain wireless communication systems, closed-loop feedback associated with a communication channel may be used to dynamically adapt communication link parameters (e.g., modulation and coding scheme, beamforming, multiple-input and multiple-output (MIMO) layers, etc.) according to time varying channel conditions, for example, due to changes with respect to user equipment (UE) mobility, weather conditions, scattering, fading, interference, noise, etc. A UE may report channel state feedback (CSF) to a network entity (e.g., a base station), which may adjust certain communication parameters in response to the feedback from the UE. Link adaptation (such as adaptive modulation and coding) with various modulation schemes and channel coding rates may be applied to certain communication channels.

As an example, a UE may measure a reference signal and estimate the channel state based on measurements of that reference signal. The UE may report an estimated channel state to the network entity in the form of CSF. In certain aspects, the CSF may indicate channel properties of a communication link between the network entity and the UE. For example, the CSF may indicate the effect of, for example, scattering, fading, and pathloss of a signal propagating across the communication link. In some cases, the CSF may indicate the UE's preferred precoding for MIMO and/or beamformed communications, for example, in the form of a precoding feedback (e.g., a precoding matrix indicator (PMI)) as further described herein. As an example, a CSF report may include a channel quality indicator (CQI), PMI, a layer indicator (LI), a rank indicator (RI), a reference signal received power (RSRP), a signal-to-interference plus noise ratio (SINR), etc. Additional or other information may be included in a CSF report.

Technical problems for reporting precoding feedback include, for example, accounting for certain communication conditions associated with an antenna panel of a network entity. In some cases, certain antenna ports (e.g., channel state information reference signal (CSI-RS) ports) associated with an antenna panel and/or a transmission-reception point (TRP) may not be used for communications. For example, an antenna panel may not be capable of using certain antenna ports due to transmit power and/or beamforming specifications. With respect to transmit power specifications, the transmit power available to an antenna panel may only be capable of enabling communications on a subset of the antenna ports, for example, due to energy conservation (e.g., to reduce energy consumption), interference mitigation (e.g., to avoid using a port that causes interference), load balancing (e.g., to send more power to other antenna ports, antenna panels, and/or TRPs), etc. In some cases, an antenna panel may only use a subset of the antenna ports for beamforming, for example, due to the antenna panel architecture differing from the virtual pool of antenna ports used for PMI feedback. Thus, certain antenna ports associated with the antenna panel and/or TRP may be capable of transmitting at certain transmit powers that are less than the specified transmit powers corresponding to PMI feedback (e.g., in terms of the amplitude of a precoder), for example, for Type-II Port Selection codebooks.

In such cases, the UE may request unavailable or unsupported transmit powers to be used for certain precoding ports (e.g., MIMO and/or beamforming) via the precoding feedback associated with Type-II Port Selection codebooks. Such misalignment between the UE preferred precoding and the capabilities of the network entity may result in signaling inefficiencies with respect to the closed-loop feedback. For example, the network entity may communicate with the UE using different beam(s) with respect to the precoding requested by the UE. Thus, the UE may repeatedly request for precoding transmit powers that are unavailable or unsupported at a network entity.

Aspects described herein overcome the aforementioned technical problems by providing port-level conditions for reporting precoding feedback. In certain aspects, a configuration for CSF may indicate certain port-level conditions for reporting precoding feedback. In some cases, the configuration may specify a maximum allowed amplitude that a UE can use for one or more ports in the precoding feedback (e.g., PMI feedback). The maximum allowed amplitude may correspond to a peak transmit power that can be applied to a precoding port at a network entity for MIMO and/or beamforming. In certain cases, the configuration may indicate that certain ports are disabled or unavailable for reporting in the precoding feedback. The disabled ports may correspond to precoding ports that are disabled at the network entity, for example, due to power savings, load balancing, interference controls, etc. In certain aspects, the port-level conditions described herein apply to particular precoding feedback codebooks, such as Type-II Port Selection codebooks, as further described herein.

The techniques for reporting precoding feedback with port-level conditions as described herein may provide various beneficial effects and/or advantages. The techniques for reporting precoding feedback may enable efficient closed-loop feedback for a communication link between a UE and a network entity. With the port-level conditions, the UE may have the information to select a precoding configuration (e.g., a beam) that can be supported at the network entity. For example, the UE may refrain from requesting, from the network entity, a precoding configuration that exceeds the maximum allowed amplitudes and/or uses disabled ports. Instead, the UE may request, from the network entity, a precoding configuration that can be supported at the network entity, which may reduce the signaling overhead of the precoding feedback as well as suppress the requests for precoding that are not aligned with the capabilities of the network entity.

The efficient closed-loop feedback may enable improved wireless communication performance, such as increased throughput, reduced latencies, communication channel efficiencies for the communications system, etc. The improved wireless communication performance may be attributable to the techniques for reporting precoding feedback described herein that allows the UE to request precoding that can be supported at the network entity. For example, in response to the UE requesting the strongest transmit beams that the network entity is capable of forming, the network entity may use such transmit beams for communications between the network entity and the UE. As such, the strongest transmit beams may facilitate the improved wireless communication performance.

In certain aspects, an antenna (or precoding) port may represent a physical or logical transmission path that maps to one or more antenna elements for wireless communications, for example, for MIMO and/or beamformed communications. Further, it should be understood that, unless otherwise specifically stated, terms such as "antenna port," "precoding port," "port," and the like are intended to be interchangeable.

The term "beam" may be used in the present disclosure in various contexts. Beam may be used to mean a set of gains and/or phases (e.g., precoding weights or co-phasing weights) applied to antenna elements in (or associated with) a wireless communication device for transmission or reception. The term "beam" may also refer to an antenna or radiation pattern of a signal transmitted while applying the gains and/or phases to the antenna elements. Other references to beam may include one or more properties or parameters associated with the antenna (or radiation) pattern, such as an angle of arrival (AoA), an angle of departure (AoD), a gain, a phase, a directivity, a beam width, a beam direction (with respect to a plane of reference) in terms of azimuth and/or elevation, a peak-to-side-lobe ratio, and/or an antenna (or precoding) port associated with the antenna (radiation) pattern. The term "beam" may also refer to an associated number and/or configuration of antenna elements (e.g., a uniform linear array, a uniform rectangular array, or other uniform array).

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects (also referred to herein as non-terrestrial network entities), such as satellite 140 (or other space borne or aerial platforms), which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communications, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
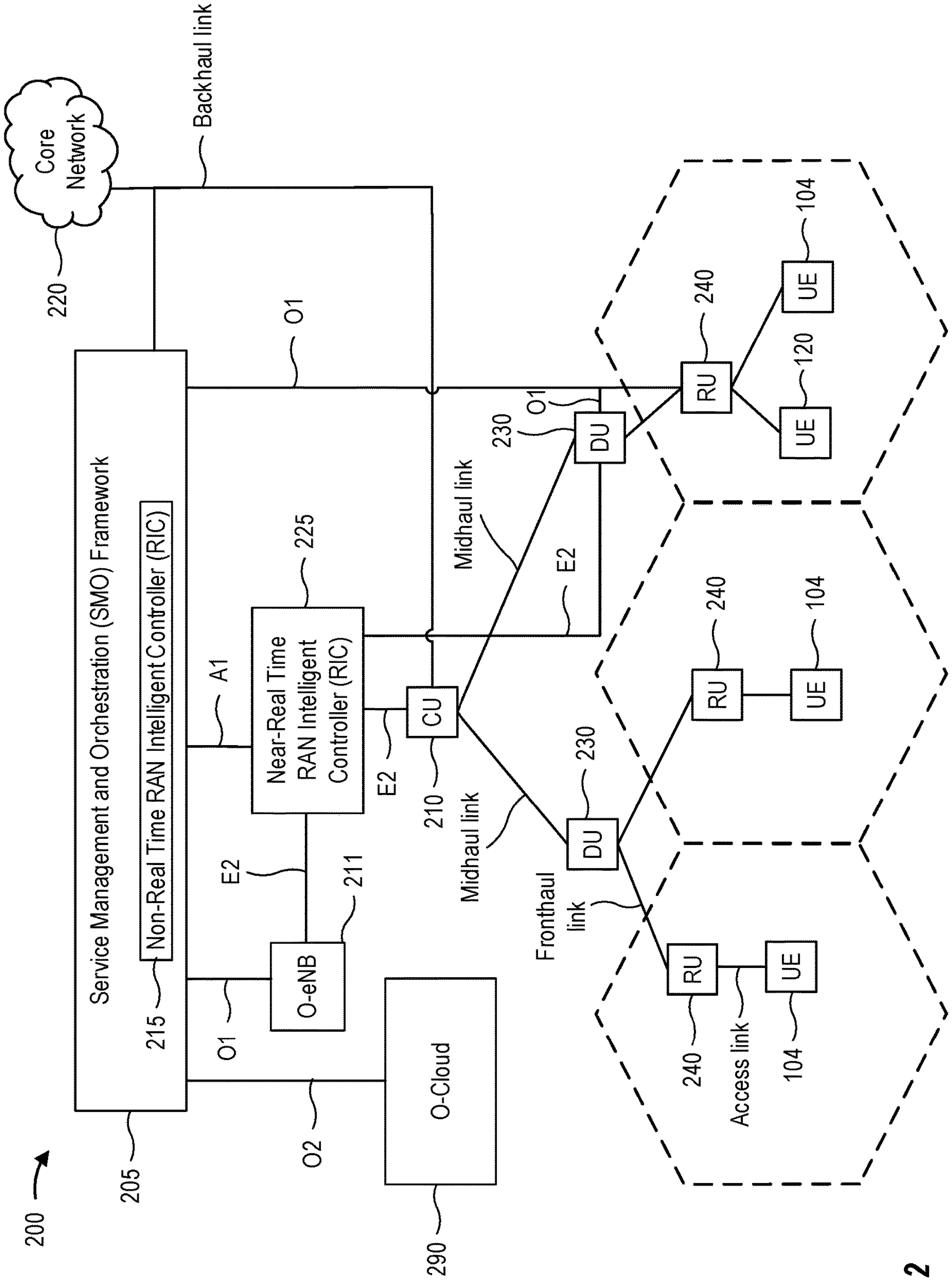
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, the 3rd Generation Partnership Project (3GPP) currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
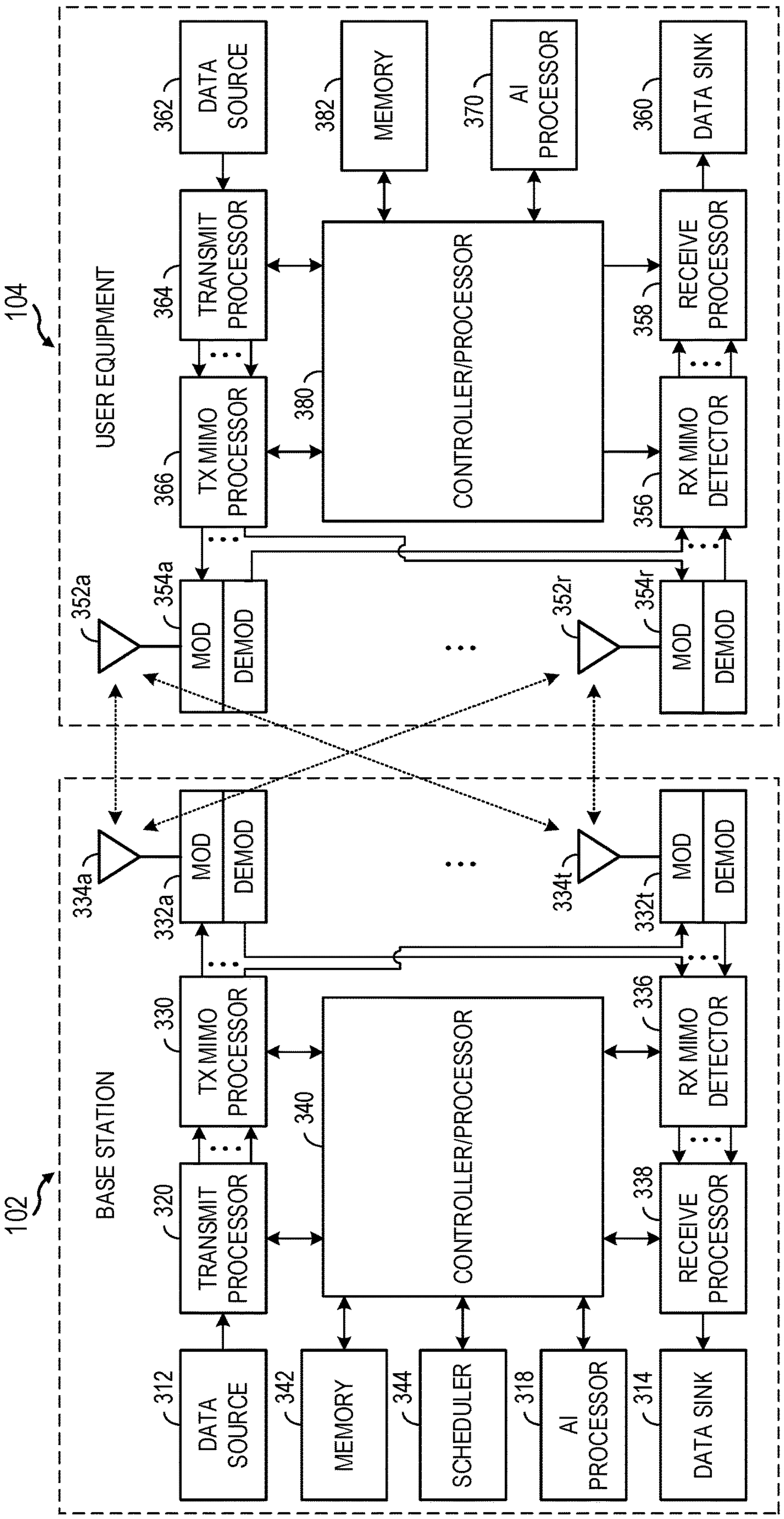
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, 370, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., global navigation satellite system (GNSS) positioning). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figures 4A, 4B, 4C, 4D:
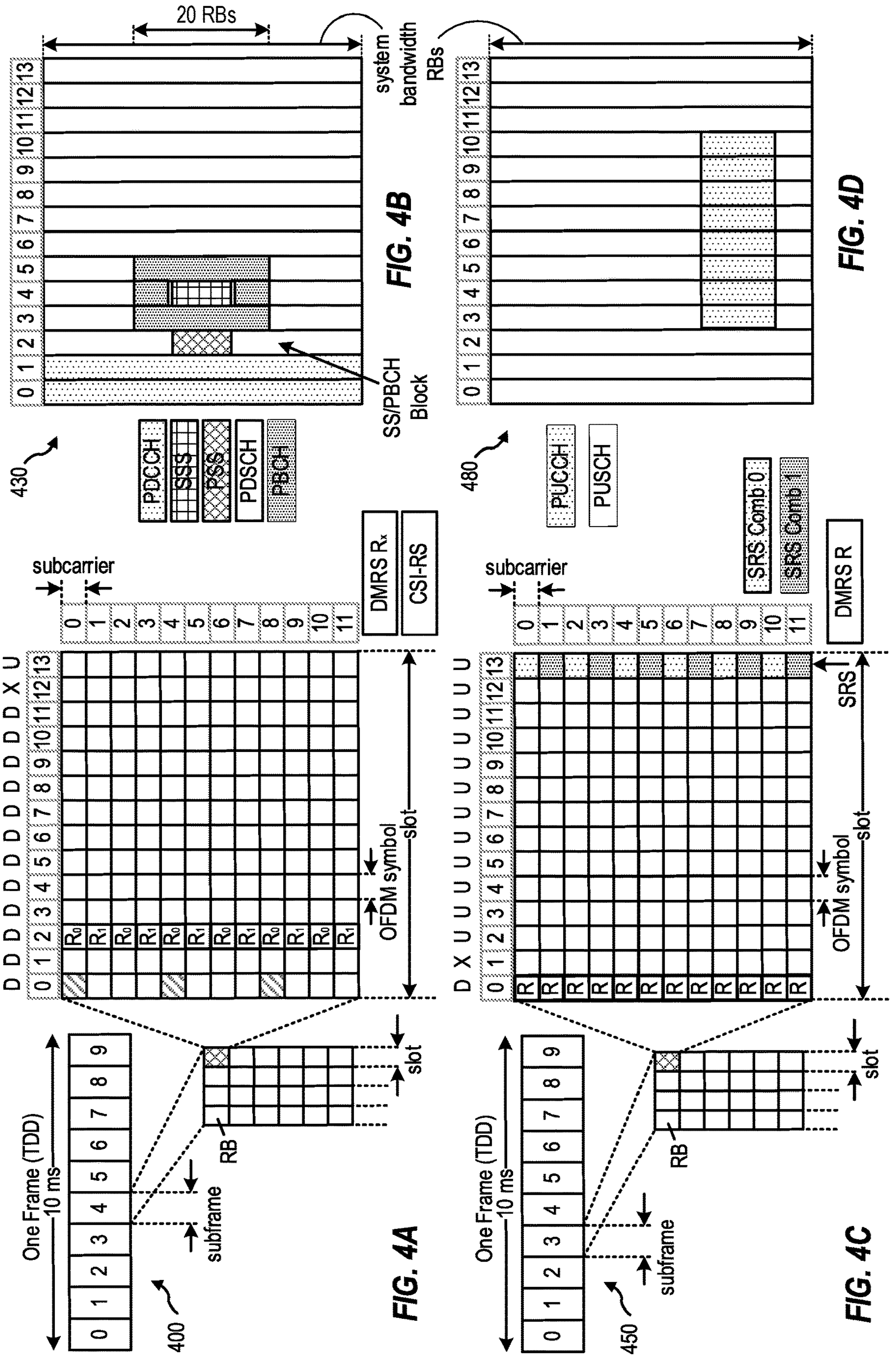
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology $\mu$, there are $2^{\mu}$ slots per subframe. Thus, numerologies ($\mu$) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^{\mu}\times15$ kHz, where $\mu$ is the numerology 0 to 6. As an example, the numerology $\mu=0$ corresponds to a subcarrier spacing of 15 kHz, and the numerology $\mu=6$ corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology $\mu=2$ with 4 slots per subframe. In such a case, the slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Channel State Feedback

In certain wireless communication systems, closed-loop feedback associated with a communication channel may be used to dynamically adapt communication parameters to channel conditions that may change over time. In some cases, a UE may receive a reference signal (e.g., SSB, CSI-RS, DM-RS, etc.) from a network entity (or another UE) and report channel state feedback to the network entity (or the other UE), where the channel state feedback is determined based on measurements of the reference signal received at the UE. In certain cases, a UE may transmit a reference signal (e.g., SSB, CSI-RS, DM-RS, PT-RS, SRS, etc.), and a network entity (or another UE) may determine characteristics associated with the channel based on measurements of the received reference signal.

Figure 5:
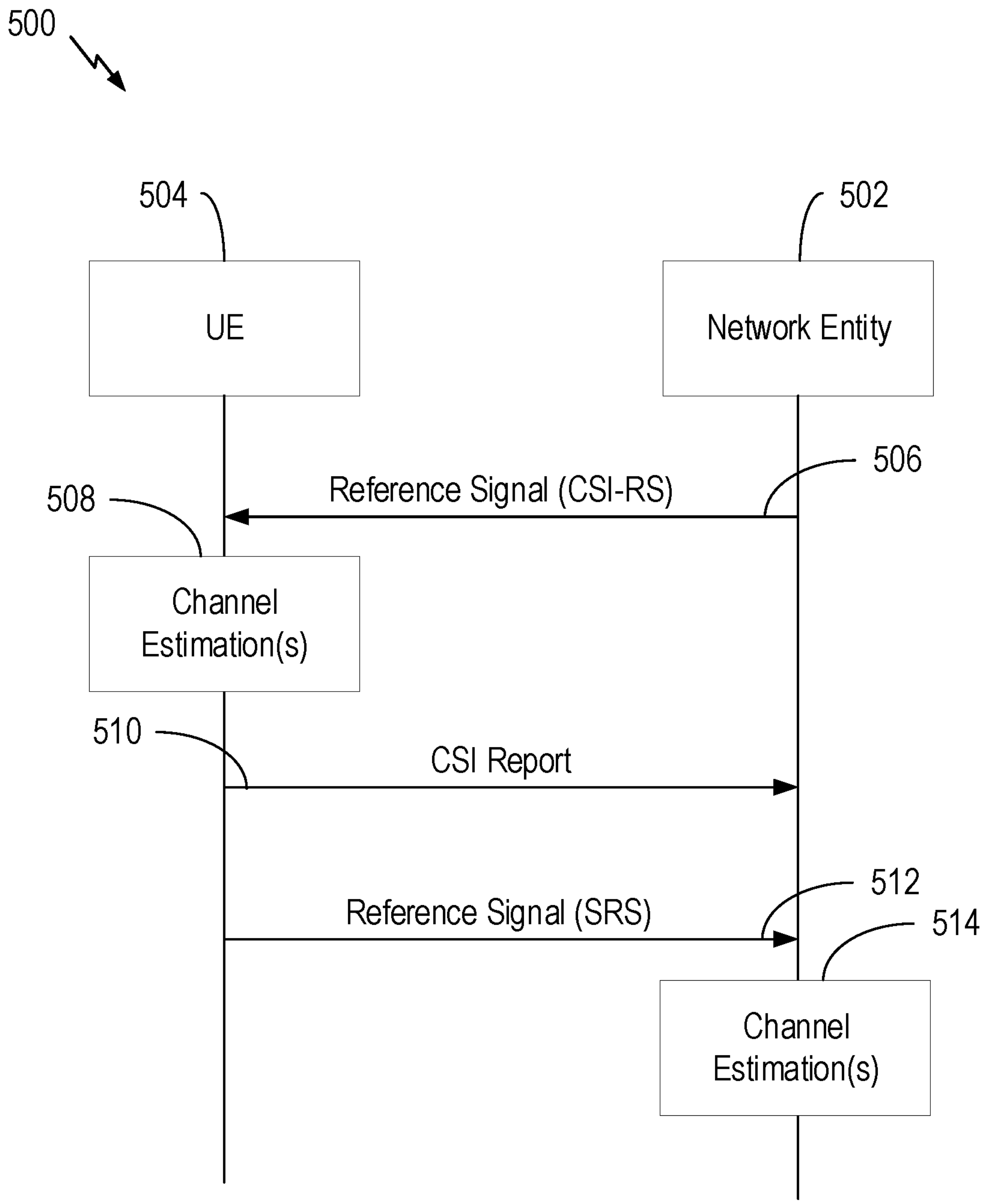
FIG. 5 depicts a process flow for closed-loop feedback associated with a communication channel between a network entity and a UE.

FIG. 5 depicts a process flow 500 for closed-loop feedback associated with a communication channel between a network entity 502 and a UE 504.

At 506, the UE 504 receives a reference signal (e.g., SSB, CSI-RS, etc.) from the network entity 502.

At 508, the UE 504 performs channel calculations based on the reference signal, such as determining a channel estimate H based on the received reference signal. For example, the UE 504 may include a demodulator, which may be part of a transceiver (e.g., transceiver 354 of FIG. 3), RX MIMO detector (e.g., RX MIMO detector 356 of FIG. 3), and/or receive processor (e.g., receive processor 358 of FIG. 3) of UE 504. The demodulator, such as a component of the demodulator, may take as input the reference signal as received over multiple antennas of the UE 504 and output a vector y that is a representation of the received reference signal as received over each of the multiple antennas of the UE 504.

Based on a received signal model, the vector $\vec{y}$ can be represented as follows in equation (1):

$$\vec{y} = H\vec{x} + \vec{n} \tag{1}$$

In equation (1), H corresponds to a matrix representation of the communications channel, as in a channel estimate of the communications channel the signal is communicated in (e.g., downlink communication channel where the reference signal is communicated), $\vec{x}$ is the vector representing symbols transmitted by network entity 502 over a number of spatial layers, and $\vec{n}$ is noise across the communications channel. In certain aspects, H has a size equal to the number of antennas used to receive the signaling, $N_{ant}$, times the number of spatial layers, $N_l$, (e.g., the number of beamformed transmissions, number of antenna ports, etc.). For example, H has a number of rows equal to $N_{ant}$ and a number of columns equal to $N_l$. In certain aspects, the symbols that form the reference signal are known by the UE 504 (e.g., configured or preconfigured at the UE). UE 504 can determine the channel estimate H based on receiving the reference signal.

In certain aspects, UE 504 may further calculate, as part of the channel calculations, a precoder (e.g., precoder matrix) V based on the channel estimate H. For example, UE 504 may be configured to perform singular value decomposition (SVD) based precoding to determine the precoder V. For example, SVD(H)=[U S V], such that SVD provides the precoder V. U may be related to the ordering of the rows of H, as in the ordering of the antennas as represented by H. It should be understood that other suitable techniques may be used to determine the precoder V based on the channel estimate H.

At 510, UE 504 sends to network entity 502 a CSI report indicating the determined channel estimate H and/or precoder V. For example, the UE may determine one or more CSI parameters, such as channel quality indicator (CQI), precoding matrix indicator (PMI), and/or rank indicator (RI) based on H and/or V. RI may represent the number of MIMO layers requested by the UE for downlink transmissions. PMI may define a set of indices corresponding to one or more precoding matrices (e.g., the precoding matrix V) to apply to downlink transmissions. In certain aspects, the PMI may indicate the UE's preferred precoding for the downlink transmissions on the PDSCH. CQI may be an indicator of channel quality, such as corresponding to H. The UE 504 may send an indication of the one or more determined CSI parameters to the network entity 502 in the CSI report. The network entity 502 may schedule downlink data transmissions to the UE 504 accordingly, such as using a modulation scheme, code rate, number of transmission layers, etc., that the network entity determines based on the CSI report.

At 512, UE 504 sends a reference signal (e.g., SSB, CSI-RS, DM-RS, PT-RS, SRS, etc.) to the network entity 502.

At 514, the network entity 502 performs channel calculations based on the reference signal, such as determining a channel estimate H based on the received reference signal, for example, as described herein with respect to the UE performing channel calculations at 508.

In certain aspects, network entity 502 may further calculate, as part of the channel calculations, a precoder (e.g., precoder matrix) V based on the channel estimate H, for example, as described herein with respect to the UE 504 performing such a calculation. Accordingly, the network entity 502 may determine H and/or V for an uplink channel between UE 604 and network entity 502 based on SRS. Further, as discussed, the uplink channel between UE 504 and network entity 502 may have reciprocity with a downlink channel between UE 504 and network entity 502. Accordingly, the determined values of H and/or V for the uplink channel between UE 504 and network entity 502 may be used for the downlink channel between UE 504 and network entity 502. In some cases, the reciprocity between the uplink channel and the downlink channel may be based on a known difference between the uplink channel and the downlink channel, such that the difference can be represented by a function. Accordingly, in certain aspects, to determine H and/or V for the downlink channel, the network entity 502 may apply a function to H and/or V determined for the uplink channel.

Aspects Related to Precoding Feedback

In certain aspects, precoding feedback described herein may be indicated via a precoding codebook. A precoding codebook may define the matrix notation for reporting the preferred precoding for one or more beams, for example, in the context of gains and phase shifts applied across antenna elements that form certain beams. Certain wireless communication systems (e.g., 5G NR or any future wireless communication system) may define the precoding codebooks used for precoding feedback. As an example, 5G NR systems may use Type-I codebooks, Type-II codebooks, and Type-II port selection codebooks.

The Type-I codebooks are primarily used for single-user MIMO (SU-MIMO) with support for high and low order MIMO transmissions (e.g., 8×8, 4×4, and 2×2 MIMO). The Type-I codebooks may be used in line-of-sight scenarios for the communication link between the UE and the network entity. The Type-I codebooks may include single panel and multi-panel codebooks, where single panel and multi-panel refer to the transmission panel(s) used at the network entity.

The Type-II codebooks are used for multi-user MIMO (MU-MIMO) with support for up to two MIMO layers. The Type-II codebooks may provide more accurate channel state information with respect to the Type-I codebooks. The Type-II codebooks may include a Type-II codebook, an Enhanced Type-II codebook, a Type-II Doppler codebook, and a Type-II coherent joint transmission (CJT) codebook The Type-II port selection codebooks are used for obtaining refined precoding feedback with respect to the Type-I and Type-II codebooks. The Type-II port selection codebooks rely on reference signals that have been beamformed at the network entity, for example, where the network entity has some knowledge of the communication channel between the UE and the network entity (e.g., knowledge derived from one of the other precoding codebooks, such as the Type-I and Type-II codebooks). The Type-II port selection codebooks may include a Type-II port selection codebook, an Enhanced Type-II Port Selection codebook, and a Further Enhanced Type-II Port Selection codebook. The Type-II codebooks and the Type-II port selection codebooks may be used in multi-path channels. The Enhanced Type-II Port Selection codebook and the Further Enhanced Type-II Port Selection codebook may be used for spatial and frequency sparsity.

Figure 6:
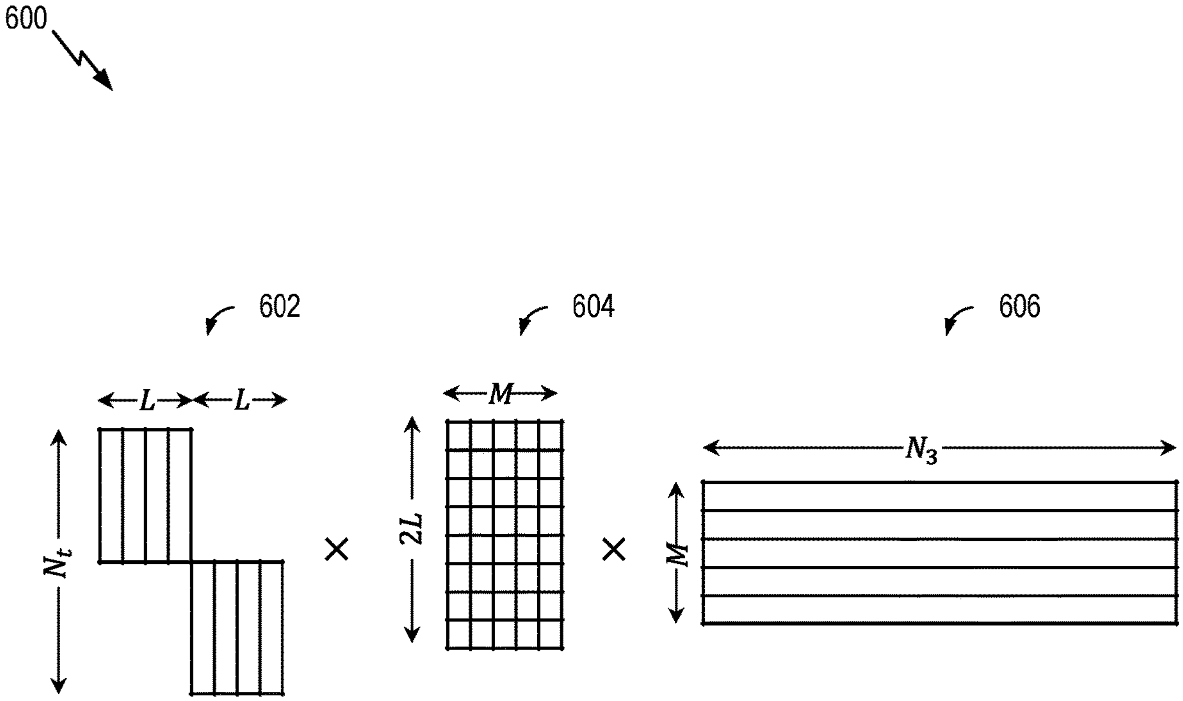
FIG. 6 illustrates a matrix notation of an example precoding feedback codebook.

FIG. 6 illustrates a matrix notation 600 of an example precoding feedback codebook, for example, an Enhanced Type-II codebook. The Enhanced Type-II codebook supports up to rank 4 precoding feedback with reduced overhead using a compression technique. In this example, a precoder matrix $W^{(\ell)}$ for a particular layer ($\ell$) may be given by the following expression:

$$W^{(\ell)} = W_1 W_{2,l} W_{f,\ell}^H$$

where $W_1$ is a wideband spatial domain (SD) basis (e.g., a beam matrix 602); $\mathbf{W}_{2,\ell}$ is a coefficient matrix 604 comprising subband phases and subband amplitudes; and $\mathbf{W}_{f,\ell}^H$ is a delay matrix 606 (e.g., a frequency domain (FD) basis) comprising delay information that maps phase information of the $N_3$ subbands to the M basis vectors. The precoder matrix $W^{(\ell)}$ has a size of $N_t \times N_3$, where $N_t$ is the number of transmit antenna elements (which may include physical or logical antenna elements), $N_3$ is the number of subbands being reported and determined by a number of CQI subbands and the number of PMI subbands per CQI subband.

The beam matrix 602 ($W_1$) is a block-diagonal matrix having a size of $N_t \times 2L$ and may be the same for all layers (e.g., layer common), where L is the number of beams being reported and may be configured via control signaling. The coefficient matrix 604 ($\mathbf{W}_{2,\ell}$) has a size of 2L×M and is specific to each layer (e.g., layer specific), where M is the number of basis vectors in the frequency domain. M may be configured via control signaling and based on the rank indicator (RI). The UE may be configured with a parameter ($K_0$) that defines the maximum number of non-zero coefficients that can be reported across all layers. The delay matrix 606 ($\mathbf{W}_{f,\ell}^H$) has a size of $M \times N_3$ and is specific to each layer (e.g., layer specific).

One difference between port selection codebooks and non-port selection codebooks (e.g., Type-I codebooks and Type-II codebooks) is in the beam selection mechanisms. In the non-port selection codebooks, the UE indicates spatial beams via CSI feedback, for example, as part of the beam matrix $W_1$. For example, the UE generates intermediate candidate beams using spatial oversampling between spatially separated orthogonal beams, and the UE may select one or several strong beams among the candidate beams based on the CSI. In port selection codebooks, the network entity transmits precoded reference signals with different precoders, where each precoder represents a particular beam and is associated with an antenna port. The UE selects several antenna ports by measurements of the corresponding reference signals and reports the coefficients. Thus, the beams are determined by antenna port selection. In FR2, the UE may indicate spatial beams during certain beam management operations, and codebooks may generally be thought of as port selection codebooks. Port selection codebooks may provide lower complexity and improved scaling for UE antenna array sizes.

Figure 7:
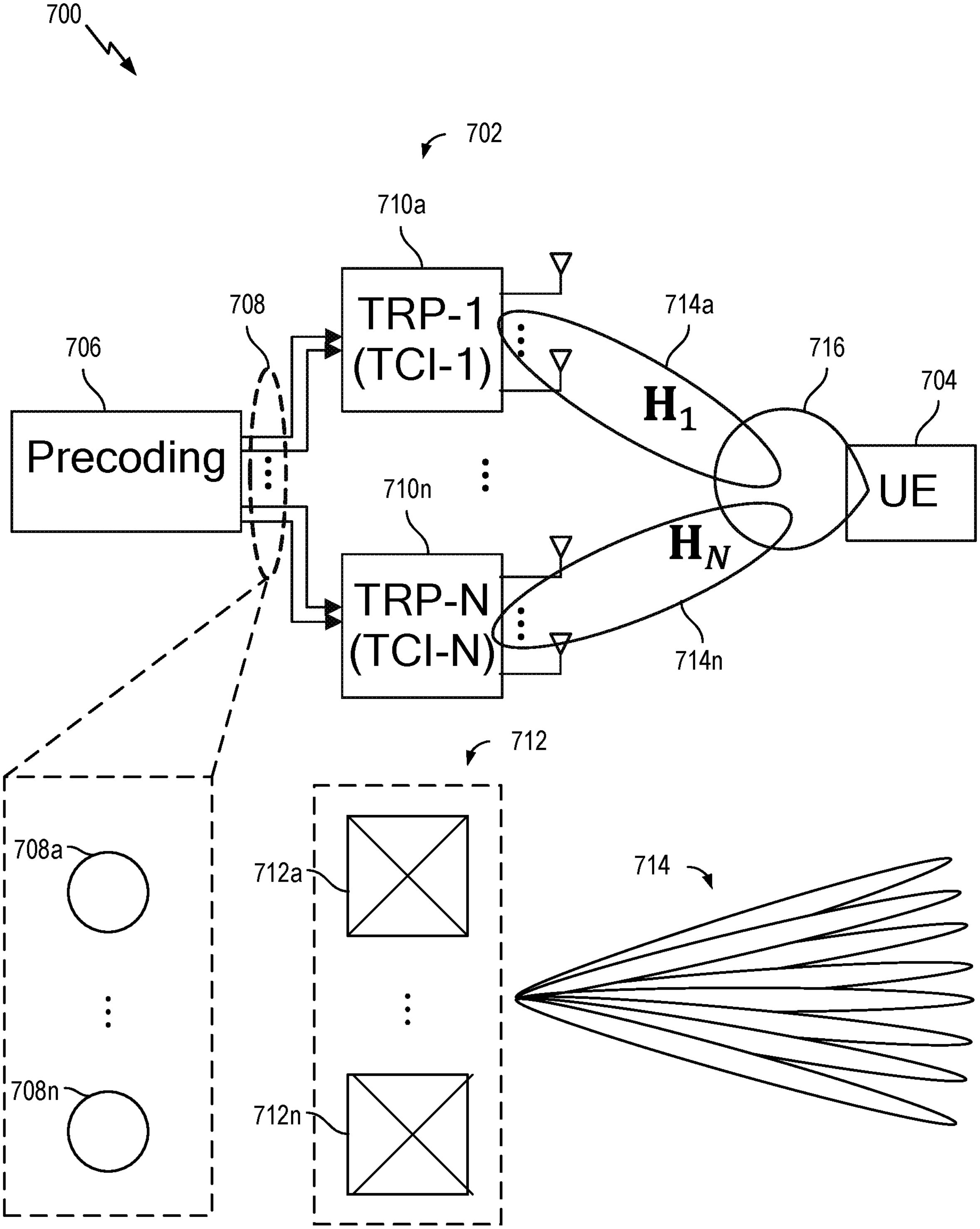
FIG. 7 illustrates an example precoding architecture for communication channels between a network entity and a UE.

FIG. 7 illustrates an example precoding architecture 700 for communication channels between a network entity 702 and a UE 704. In this example, the network entity 702 may perform precoding 706 (e.g., digital precoding) for beamformed communications. For digital precoding, the network entity 702 may generate different signals having different phases and/or powers in the digital domain for each antenna element to form a beamformed transmission of a precoded signal, which may be associated with a precoding antenna port (e.g., a CSI-RS antenna port) among a pool of antenna ports 708_a-n_ (collectively the antenna ports 708). A precoding antenna port (e.g., the antenna port 708) may correspond to one or more antenna elements used to form a beam (e.g., the transmit beam 714_a_) on a given communication channel (e.g., $H_1$) between the network entity 702 and the UE 704.

In certain cases, the network entity 702 may include a plurality of transmission-reception points (TRPs) 710_a-n_. A TRP may be or include an antenna panel having a plurality of antenna elements 712_a-n_ (collectively the antenna elements 712), for example, arranged in an array. In some cases, the antenna elements 712 may include cross-polar antenna elements. The antenna elements 712 may be used to form various transmit beams 714, where each of the transmit beams 714 may correspond to a specific precoding antenna port among the antenna ports 708. For example, the first precoding antenna port 708*a* may correspond to the first transmit beam 714*a* formed via the first TRP 710*a*, and the nth precoding antenna port 708*n* may correspond to the nth transmit beam 714*n* formed via the nth TRP 710*n*. The UE 704 may receive signals from the network entity 702 via a receive beam 714.

In beam-based operation (e.g., millimeter wave bands), the actual spatial domain basis vectors may not be based on specific DFT structures. Depending on the network entity and/or UE implementation, different beam patterns may be used, and these beam patterns may be transparent to the other node. For example, the actual beam weights may not be from a specific DFT dictionary and may not be known to the other node. In this context, Type-II port selection-based codebooks may be used for precoding feedback, where the beam matrix $W_1$ may have binary entries (e.g., "1" indicating the corresponding port is selected, "0" otherwise).

Aspects Related to Codebook Subset Restriction for Beamformed Communications

As discussed herein, precoding feedback for port selection codebook(s) may apply certain port-level condition(s) to enable such codebooks to account for certain communication conditions associated with an antenna panel of a network entity. For example, a network entity may have transmit power specifications that affect the beams available for communications, and thus, the corresponding precoding ports available for selection. In some cases, certain combination of weights (e.g., amplitude coefficients in $W_2$) may not be supported by a network entity.

In certain aspects, the port-level conditions may include a maximum allowed amplitude that can be reported for certain precoding antenna ports (e.g., CSI-RS antenna ports). For example, the network entity may indicate the maximum allowed amplitude(s) that a UE can use for one or more ports in precoding feedback, such as port selection codebooks for PMI feedback. In certain aspects, the maximum allowed amplitude(s) may be specific to a particular precoding port and/or a type of codebook (e.g., Type-II port selection, Enhanced Type-II port selection, and/or Further Enhanced Type-II port selection codebook). In some aspects, the maximum allowed amplitude(s) may be applied to certain MIMO layers (e.g., layer specific) and/or common to the MIMO layers (e.g., layer common).

FIG. 8 illustrates example mappings of amplitude coefficients used for precoding feedback. In this example, a first mapping 802 maps indices to amplitude coefficient values, and a second mapping 804 maps bits (e.g., bitmap) to maximum allowed amplitude coefficients. In the first mapping 802, the column $k_{l,i}$ represents the index values, and the column $p_{l,i}$ represents the amplitude coefficient values. In the second mapping, the column $b_i$ represents the bitmap values, and the column $\check{p}_i$ represents the maximum allowed coefficient values. The first mapping 802 may provide all of the available amplitude coefficient values supported by a codebook, whereas the second mapping 804 may include the maximum allowed amplitude coefficients that effectively limit the first mapping 802. For example, without a maximum allowed amplitude specified for a particular port or layer, the non-zero coefficients for amplitude may be selected from the first mapping 802. With a maximum allowed amplitude specified for a particular port or layer, the maximum amplitude of a non-zero coefficient may not exceed the indicated (or configured) value from the second mapping 804.

In certain aspects, the port-level conditions may include an indication of whether one or more precoding ports are enabled or disabled for reporting in precoding feedback to the network entity. In certain cases, a network entity may disable a group of precoding ports for precoding feedback, for example, to provide power savings, mitigate against interference, or shift power to other antenna ports. The disabled group of ports may correspond to a specific antenna panel or TRP. In some cases, the disabled group of ports may correspond to a specific carrier frequency (e.g., component carrier) or bandwidth part (BWP). For example, the disabled precoding ports (e.g., CSI-RS antenna ports) may correspond to transmits beams formed using a specific antenna panel (e.g., the TRP 710*a*) at the network entity, and the network entity may temporarily refrain from using the precoding ports in order to provide power savings, mitigate against interference (e.g., encountered as self-interference at the network entity or at other devices), or shift power to other precoding ports (e.g., the ports corresponding to the TRP 710*n*).

Example Operations of Reporting Precoding Feedback

Figure 9:
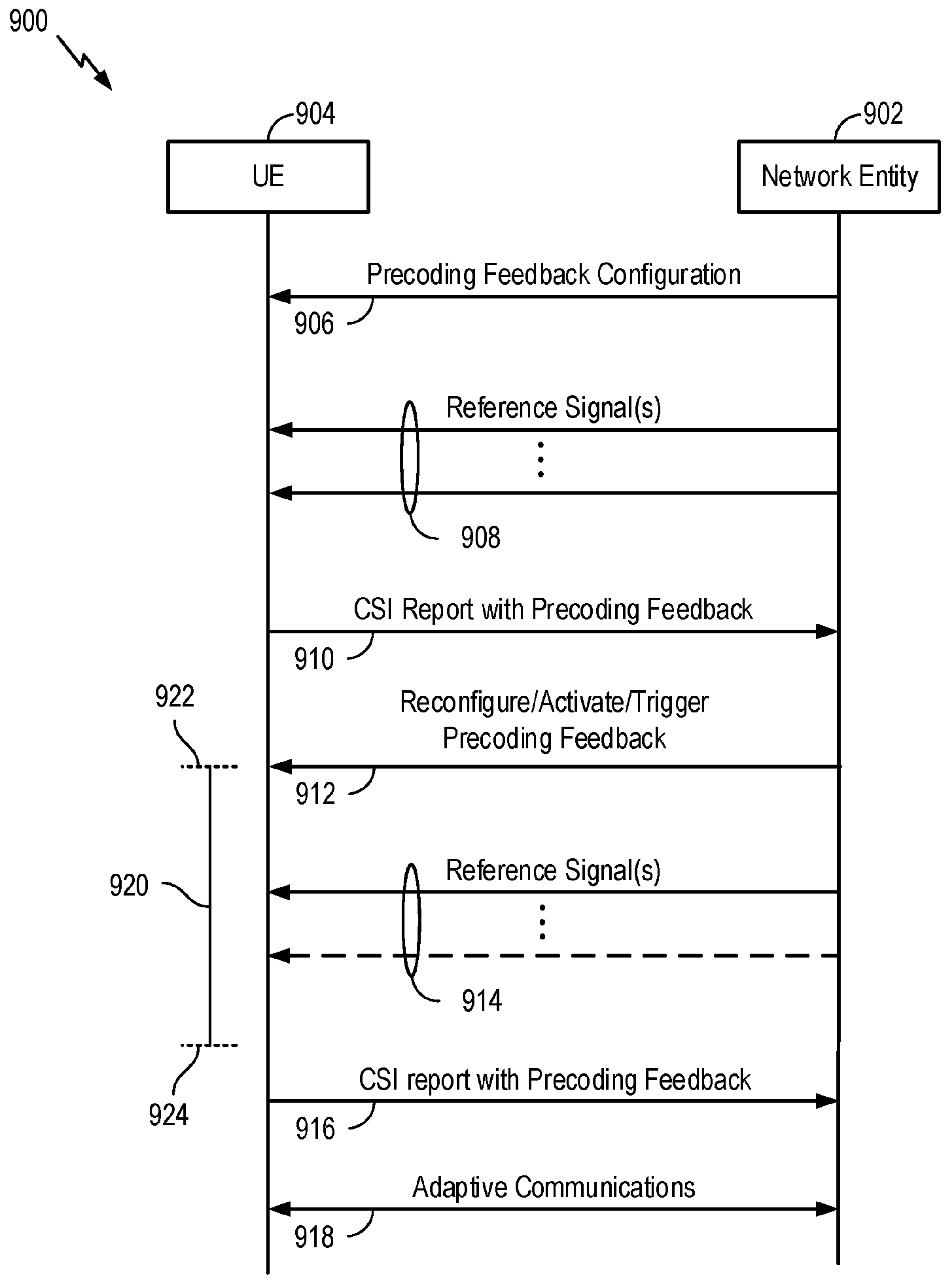
FIG. 9 depicts a process flow for communications in a system between a network entity and a UE.

FIG. 9 depicts a process flow 900 for communications in a system between a network entity 902 and a UE 904. In some aspects, the network entity 902 may be an example of the BS 102 depicted and described with respect to FIGS. 1 and 3 or a disaggregated base station depicted and described with respect to FIG. 2. Similarly, the UE 904 may be an example of UE 104 depicted and described with respect to FIGS. 1 and 3. However, in other aspects, UE 904 may be another type of wireless communications device and network entity 902 may be another type of network entity or network node, such as those described herein.

At 906, the UE 904 receives, from the network entity 902, a precoding feedback configuration that indicates the port-level conditions for certain port selection codebooks, for example, as discussed above. In certain aspects, the UE 904 may receive the precoding feedback configuration via Layer-1 signaling (e.g., downlink control information (DCI) or sidelink control information (SCI)), Layer-2 signaling (e.g., medium access control), Layer-3 signaling (e.g., radio resource control), and/or system information. As an example, the precoding feedback configuration may include a codebook configuration (e.g., the RRC information element CodebookConfig) for PMI feedback. In certain aspects, the precoding feedback configuration may indicate one or more maximum allowed amplitudes that can be reported for certain precoding antenna ports, for example, as indicated via the second mapping 804 in FIG. 8. In certain aspects, the precoding feedback configuration may indicate that one or more ports are disabled for reporting precoding feedback. In some cases, the UE 904 may be preconfigured with a precoding feedback configuration that indicates the port-level conditions for port selection codebooks, for example, per a wireless communications specification.

At 908, the UE 904 receives, from the network entity 902, one or more (precoded) reference signals that correspond to different antenna ports (e.g., CSI-RS ports), for example, as described herein with respect to FIGS. 5 and 7. The reference signal(s) may include, for example, an SSB, CSI-RS, DM-RS, etc. As an example with respect to FIG. 7, the network entity 902 may transmit a first reference signal via a first beam (e.g., the first beam 714*a*) corresponding to a first CSI-RS port (e.g., the first precoding antenna port 708*a*), and the network entity 902 may transmit a second reference signal via a second beam (e.g., the nth beam 714*n*) corresponding to a second CSI-RS port (e.g., the nth precoding antenna port 708*n*).

At 910, the UE 904 sends, to the network entity 902, a CSI report comprising precoding feedback, for example, precoding information formatted according to a PMI codebook as described. The precoding feedback may be provided in accordance with the configuration obtained at 906. The precoding feedback may adhere to any port-level conditions set for the precoding feedback. For example, if the configuration sets a maximum allowed amplitude $$\left(\text{e.g., } \sqrt{\frac{1}{4}}\right)$$

for one or more ports (e.g., the first CSI-RS port as discussed above), the amplitude requested for those port(s) in the precoding feedback may not exceed the maximum allowed amplitude (e.g., the amplitude coefficient in the precoding feedback is less than or equal to the maximum allowed amplitude). As another example, if the configuration disables one or more ports, the UE 904 may refrain from selecting those ports or requesting certain amplitude and/or phase coefficients for those ports in the context of precoding feedback. The port-level conditions may enable the UE 904 to refrain from requesting, from the network entity 902, a precoding configuration that exceeds the maximum allowed amplitudes and/or uses disabled ports. Thus, the port-level conditions may reduce the signaling overhead of the precoding feedback as well as suppress requests for precoding that are not aligned with the capabilities of the network entity.

At 912, the UE 904 receives, from the network entity 902, an indication that reconfigures, activates/deactivates, and/or triggers precoding feedback that applies the port-level conditions described herein. For example, the indication may update the configuration for the precoding feedback, where the updated configuration applies the port-level conditions described herein, for example, for periodic, semi-persistent, and/or aperiodic precoding feedback. In some cases, the UE receives an indication to activate or deactivate a specific configuration, which applies the port-level conditions described herein, for the precoding feedback, for example, for semi-persistent precoding feedback. In certain cases, the UE 904 receives an indication to trigger precoding feedback that applies the port-level conditions described herein, for example, for aperiodic precoding feedback. In certain aspects, the indication may modify the maximum allowed amplitudes that can be reported for antenna ports. In some cases, the indication may add or remove antenna ports that have certain maximum allowed amplitudes or that are disabled. In certain cases, the indication may adjust the maximum allowed amplitudes associated with one or more antenna ports. The UE 904 may receive the indication via Layer-1, Layer-2, and/or Layer-3.

In some cases, as disabled ports may be for long-term communication conditions, for example, due to a specific antenna panel implementation, the configuration that disables ports may be applied for a longer time period compared to the maximum allowed amplitudes. The maximum allowed amplitudes may vary depending on the spatial beams (and corresponding port) selected for each TRP or antenna panel. The maximum allowed amplitudes may vary depending on the frequency including the carrier frequency and/or BWP. The maximum allowed amplitudes may vary depending on the transmission time (e.g., a transmission time interval).

At 914, the UE 904 receives, from the network entity 902, one or more (precoded) reference signals, for example, as described with respect to 908. However, in this case, the network entity 902 may modify the amplitudes and/or the antenna ports used for precoding per the updated configuration. For example, the network entity may refrain from using the first antenna port.

At 916, the UE 904 sends, to the network entity 902, a CSI report comprising precoding feedback in accordance with the updated configuration, activated configuration, and/or aperiodic trigger.

In certain aspects, the UE 904 may be configured with a usage delay 920 that defines when the UE 904 is allowed or expected to apply the modified/activated configuration and/or report aperiodic precoding feedback. The usage delay 920 may represent the minimum time between when the UE 904 obtains the modified configuration and when the UE 904 is allowed to report the precoding feedback in accordance with the modified configuration. In some cases, the usage delay 920 may be considered a CSI computation time and/or an application delay in the context of applying modified port-level conditions (e.g., a maximum allowed amplitude and/or a disabled port) for precoding feedback. In general, the usage delay 920 may provide the minimum time for the UE 904 to generate the precoding feedback in accordance with the modified port-level conditions. The usage delay 920 may start at a reference time 922 when the UE 904 receives the indication modifying, activating, or triggering the precoding feedback at reference time 922. As an example, the reference time 922 may correspond to the last symbol of the PDCCH/PDSCH activating the configuration, modifying the configuration, and/or triggering an aperiodic CSI report comprising precoding feedback, for example, at 912. The usage delay 920 may be defined as duration in terms of a time domain resource (e.g., a number of symbols, slots, etc.) and/or a unit of time (e.g., milliseconds, seconds, etc.). The UE 904 may provide the CSI report in a time domain resource that starts no earlier than the last symbol 924 of the usage delay 920. In this example, the UE 904 sends the CSI report in a symbol that starts after the last symbol 924.

At 918, the UE 904 communicates with the network entity 902 via adaptive communications. The precoding feedback described herein may enable the network entity 902 to communicate with the UE 904 using a communication channel (e.g., any of the beams 714) that provides the strongest channel conditions. The network entity 902 may switch the beam(s) used for communications as the precoding feedback indicates to do so, for example, due to time varying conditions, such as UE mobility, weather conditions, scattering, fading, interference, noise, channel load, etc. The network entity 902 may communicate with a beam as reported in the precoding feedback. The precoding feedback may apply the port-level conditions as described herein for port selection codebooks.

Example Operations

Figure 10:
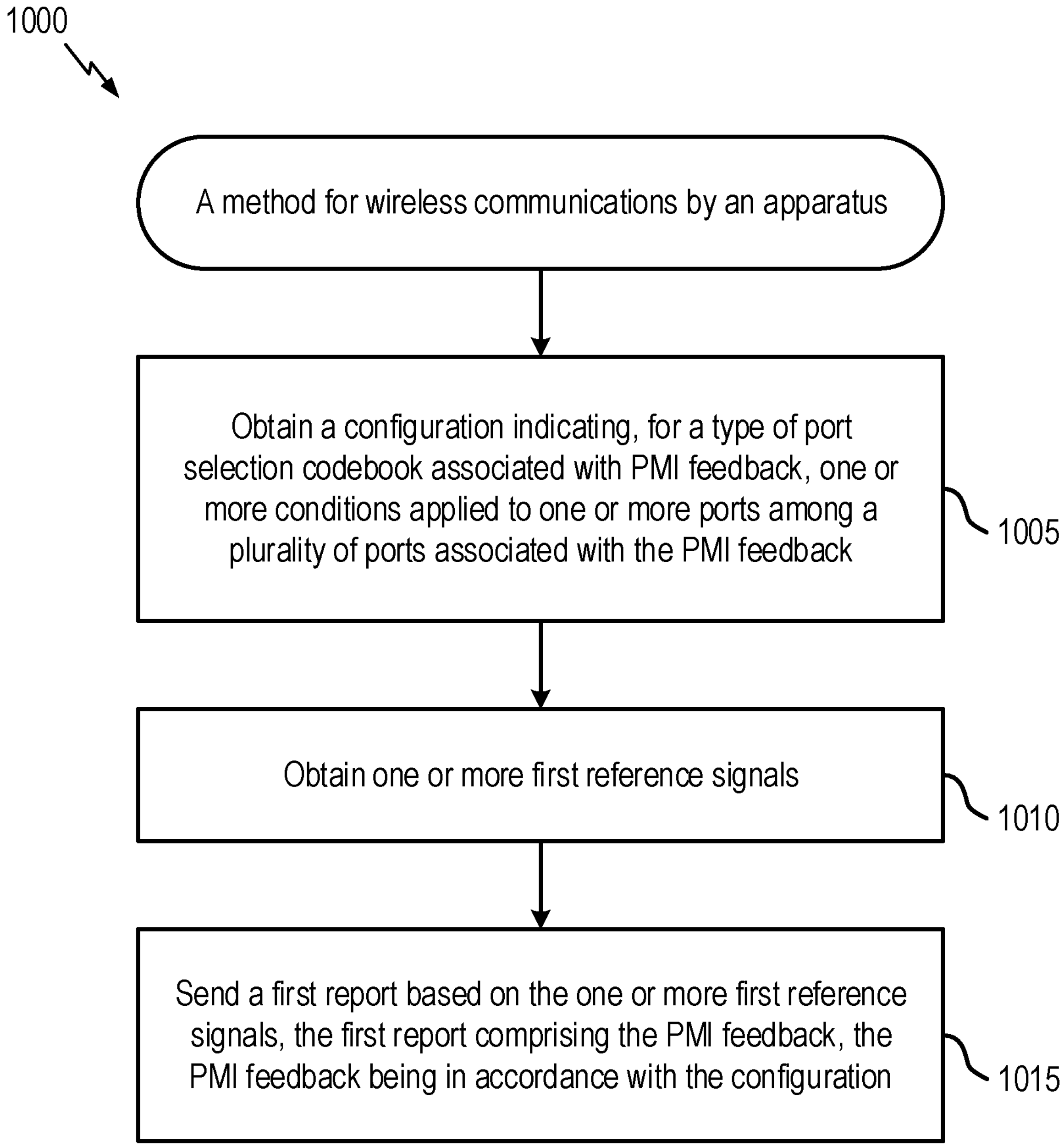
FIG. 10 depicts a method for wireless communications.

FIG. 10 shows a method 1000 for wireless communications by an apparatus, such as UE 104 of FIGS. 1 and 3.

Method 1000 begins at block 1005 with obtaining a configuration indicating, for a type of port selection codebook associated with PMI feedback, one or more conditions applied to one or more ports among a plurality of ports associated with the PMI feedback, for example, as described herein with respect to FIGS. 7-9. The ports may include precoding antenna ports as described herein, and thus, each of the ports may correspond to a certain beam (e.g., the first beam 714*a*). In certain aspects, each of the one or more ports is associated with a different spatial beam. A port may map to the precoding used to form a spatial beam, for example, as described herein with respect to FIG. 7. For a port selection codebook, the PMI feedback may indicate a selection of at least one port among the plurality of ports and the corresponding precoding coefficients (e.g., amplitude and/or phase) associated with the at least one port. In certain aspects, obtaining the configuration comprises obtaining the configuration via control signaling including, for example, DCI signaling, SCI signaling, MAC signaling, RRC signaling, and/or system information.

Method 1000 then proceeds to block 1010 with obtaining one or more first reference signals, for example, as described herein with respect to FIG. 9.

Method 1000 then proceeds to block 1015 with sending a first report (e.g., a CSI report) based on the one or more first reference signals, the first report comprising the PMI feedback, the PMI feedback being in accordance with the configuration. The first report may include channel state information that is measured from the reference signals and/or calculated from measurements of the reference signals. The PMI feedback may be in accordance with the configuration by adhering to (or satisfying) the one or more conditions applied to one or more ports.

In certain aspects, the one or more conditions include one or more first maximum allowed amplitude coefficients, for example, as described herein with respect to FIG. 8. In certain aspects, each of the one or more first maximum allowed amplitude coefficients define a peak amplitude that the apparatus is allowed to report for a port in the PMI feedback. In certain aspects, each of the one or more first maximum allowed amplitude coefficients is set to a value among a set of values for a maximum allowed amplitude, wherein the set of values include 0, $$\sqrt{\frac{1}{4}}, \sqrt{\frac{1}{2}},$$

and 1.

In certain aspects, the configuration further indicates, for each of the one or more ports, a maximum allowed amplitude coefficient selected from the one or more first maximum allowed amplitude coefficients. The port-level conditions may provide a maximum allowed amplitude coefficient per port and/or a group of ports.

In certain aspects, the configuration further indicates that the one or more first maximum allowed amplitude coefficients are specific to the type of port selection codebook. In certain aspects, the type of port selection codebook includes a Type-II port selection codebook, an enhanced Type-II port selection codebook, a further enhanced Type-II port selection codebook, and/or any future type of port selection codebook used for precoding feedback.

In certain aspects, the configuration further indicates that the one or more first maximum allowed amplitude coefficients are common to a plurality of MIMO layers or specific to a MIMO layer.

In certain aspects, the apparatus may obtain a configuration that modifies the port-level condition, activates a port-level condition, and/or triggers reporting of precoding feedback in accordance with a port-level condition, for example, as described herein with respect to FIG. 9. In certain aspects, method 1000 further includes obtaining an indication to report the PMI feedback, where the PMI feedback is in accordance with one or more second maximum allowed amplitude coefficients. In certain aspects, method 1000 further includes obtaining one or more second reference signals. In certain aspects, method 1000 further includes sending a second report based on the one or more second reference signals according to a usage delay (e.g., the usage delay 920) for the one or more second maximum allowed amplitude coefficients, the second report comprising the PMI feedback, the PMI feedback being in accordance with the one or more second maximum allowed amplitude coefficients. In certain aspects, the usage delay defines an earliest time of when the one or more second maximum allowed amplitude coefficients are to be applied to the PMI feedback, the earliest time (e.g., the last symbol 924) being relative to when the indication to use one or more second maximum allowed amplitude coefficients is obtained (e.g., the reference time 922).

In certain aspects, the one or more first maximum allowed amplitude coefficients depend on one or more of a carrier, a bandwidth part of the carrier, or a transmission time interval.

In certain aspects, the one or more conditions include one or more indications that the one or more ports are disabled for reporting in the PMI feedback; and the PMI feedback excludes precoding information associated with the one or more ports.

Figure 12:
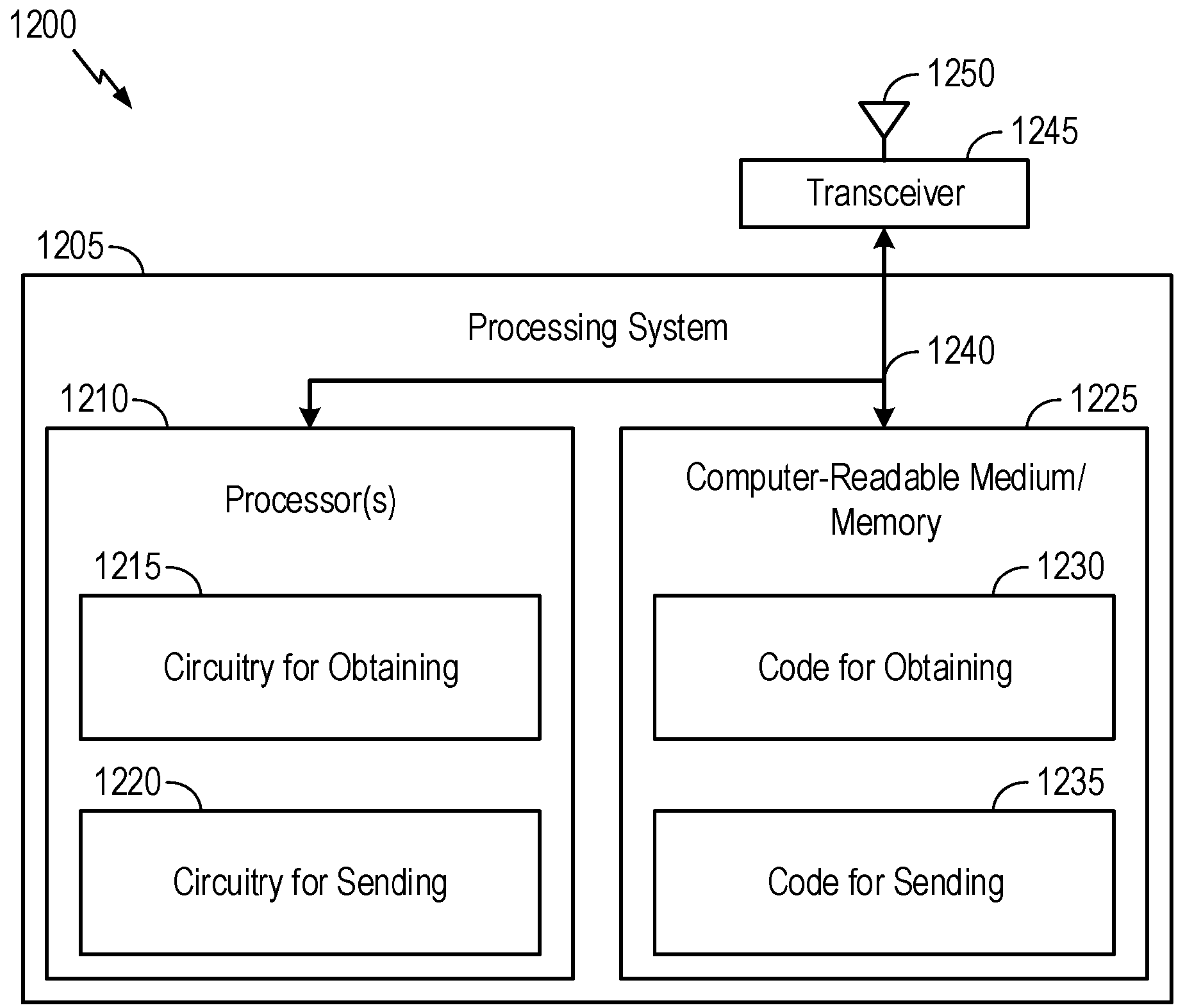
FIG. 12 depicts aspects of an example communications device.

In certain aspects, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative operations are possible consistent with this disclosure.

Figure 11:
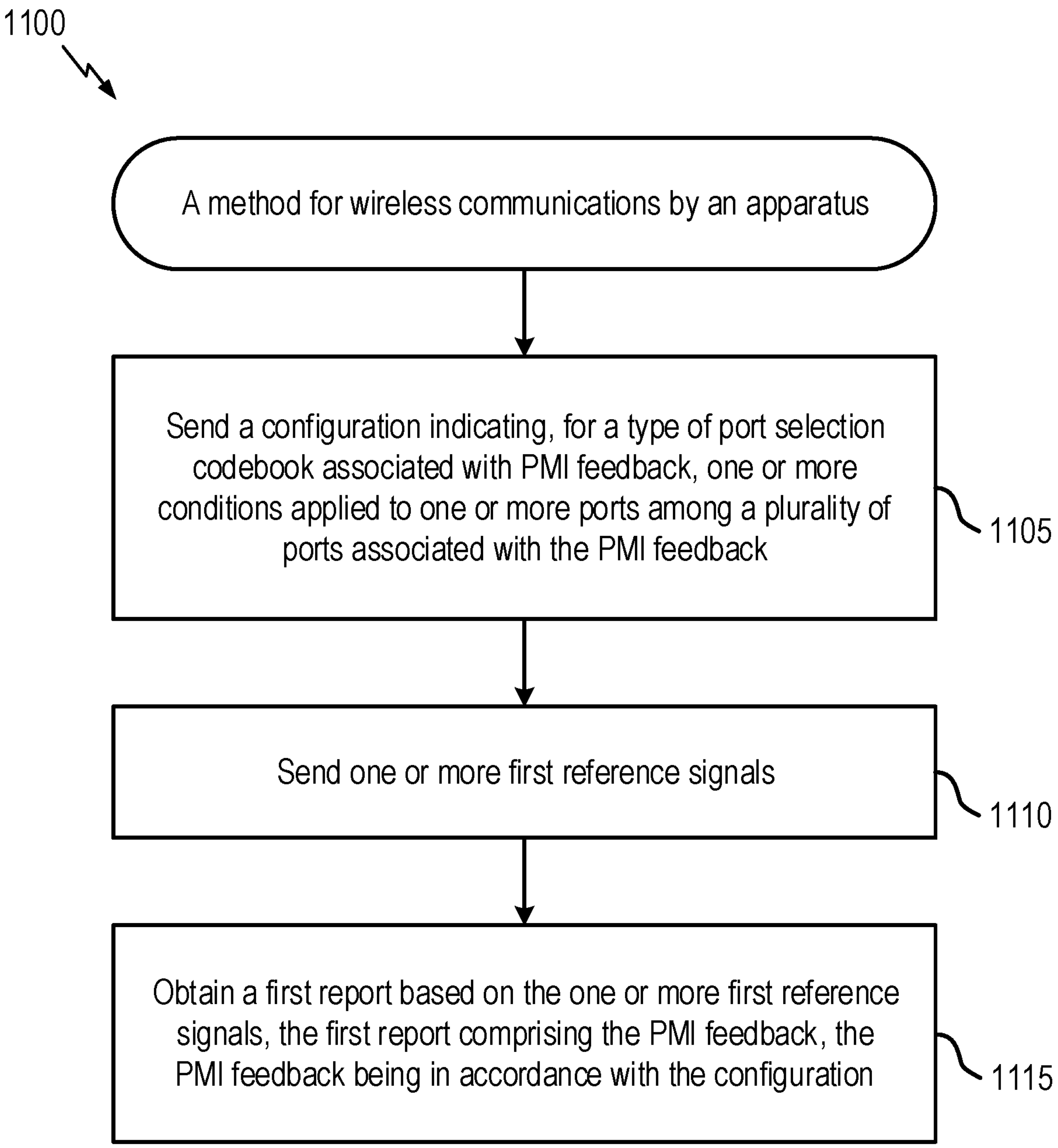
FIG. 11 depicts another method for wireless communications.

FIG. 11 shows a method 1100 for wireless communications by an apparatus, such as BS 102 of FIGS. 1 and 3, or a disaggregated base station as discussed with respect to FIG. 2.

Method 1100 begins at block 1105 with sending a configuration indicating, for a type of port selection codebook associated with PMI feedback, one or more conditions applied to one or more ports among a plurality of ports associated with the PMI feedback, for example, as described herein with respect to FIGS. 7-9. The ports may include precoding antenna ports as described herein, and thus, each of the ports may correspond to a certain beam (e.g., the first beam 714*a*). In certain aspects, each of the one or more ports is associated with a different spatial beam. A port may map to the precoding used to form a spatial beam, for example, as described herein with respect to FIG. 7. For a port selection codebook, the PMI feedback may indicate a selection of at least one port among the plurality of ports and the corresponding precoding coefficients (e.g., amplitude and/or phase) associated with the at least one port. In certain aspects, sending the configuration comprises sending the configuration via control signaling including, for example, DCI signaling, SCI signaling, MAC signaling, RRC signaling, and/or system information.

Method 1100 then proceeds to block 1110 with sending one or more first reference signals, for example, as described herein with respect to FIG. 9.

Method 1100 then proceeds to block 1115 with obtaining a first report based on the one or more first reference signals, the first report comprising the PMI feedback, the PMI feedback being in accordance with the configuration. The first report may include channel state information that is measured from the reference signals and/or calculated from measurements of the reference signals. The PMI feedback may be in accordance with the configuration by adhering to (or satisfying) the one or more conditions applied to one or more ports.

In certain aspects, the one or more conditions include one or more first maximum allowed amplitude coefficients, for example, as described herein with respect to FIG. 8. In certain aspects, each of the one or more first maximum allowed amplitude coefficients define a peak amplitude that a user equipment is allowed to report for a port in the PMI feedback. In certain aspects, each of the one or more first maximum allowed amplitude coefficients is set to a value among a set of values for a maximum allowed amplitude, wherein the set of values include 0, $$\sqrt{\frac{1}{4}}, \sqrt{\frac{1}{2}},$$

and 1.

In certain aspects, the configuration further indicates, for each of the one or more ports, a maximum allowed amplitude coefficient selected from the one or more first maximum allowed amplitude coefficients. The port-level conditions may provide a maximum allowed amplitude coefficient that applies to a specific port and/or a group of ports.

In certain aspects, the configuration further indicates that the one or more first maximum allowed amplitude coefficients are specific to the type of port selection codebook. In certain aspects, the type of port selection codebook includes a Type-II port selection codebook, an enhanced Type-II port selection codebook, a further enhanced Type-II port selection codebook, and/or any future type of port selection codebook used for precoding feedback.

In certain aspects, the configuration further indicates that the one or more first maximum allowed amplitude coefficients are common to a plurality of MIMO layers.

In certain aspects, method 1100 further includes sending an indication to report the PMI feedback in accordance with one or more second maximum allowed amplitude coefficients. In certain aspects, method 1100 further includes sending one or more second reference signals. In certain aspects, method 1100 further includes obtaining a second report based on the one or more second reference signals according to a usage delay (e.g., the usage delay 920) for the one or more second maximum allowed amplitude coefficients, the second report comprising the PMI feedback, the PMI feedback being in accordance with the one or more second maximum allowed amplitude coefficients. In certain aspects, the usage delay defines an earliest time of when the one or more second maximum allowed amplitude coefficients are to be applied to the PMI feedback, the earliest time (e.g., the last symbol 924) being relative to when the indication to use one or more second maximum allowed amplitude coefficients is obtained (e.g., the reference time 922).

In certain aspects, the one or more first maximum allowed amplitude coefficients depend on one or more of a carrier, a bandwidth part of the carrier, or a transmission time interval.

In certain aspects, the one or more conditions include one or more indications that the one or more ports are disabled for reporting in the PMI feedback; and the PMI feedback excludes precoding information associated with the one or more ports.

Figure 13:
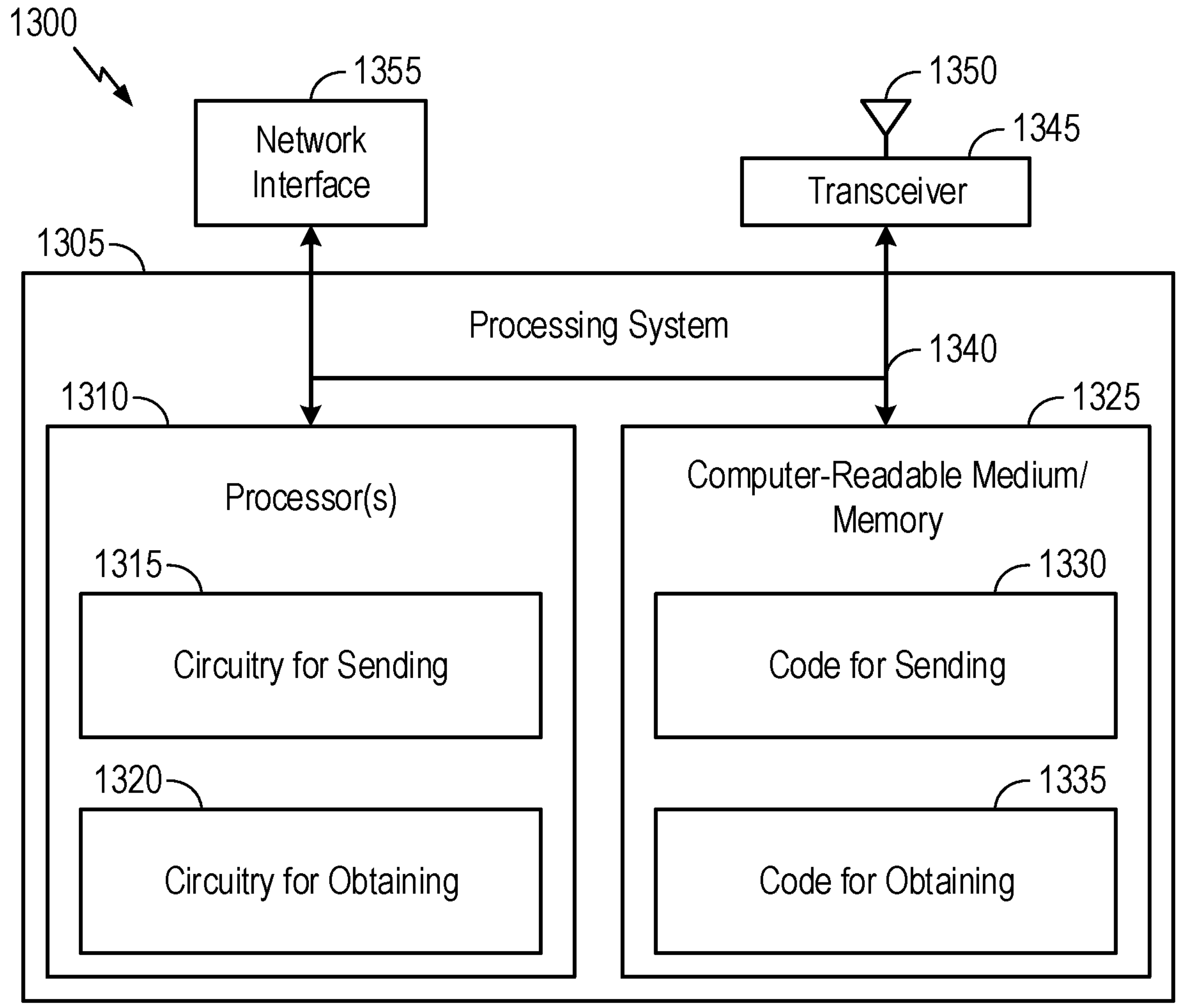
FIG. 13 depicts aspects of an example communications device.

In certain aspects, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative operations are possible consistent with this disclosure.

Example Communications Devices

FIG. 12 depicts aspects of an example communications device 1200. In some aspects, communications device 1200 is a user equipment, such as UE 104 described above with respect to FIGS. 1 and 3.

The communications device 1200 includes a processing system 1205 coupled to a transceiver 1245 (e.g., a transmitter and/or a receiver). The transceiver 1245 is configured to transmit and receive signals for the communications device 1200 via an antenna 1250, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1225 via a bus 1240. In certain aspects, the computer-readable medium/memory 1225 is configured to store instructions (e.g., computer-executable code) that when executed by the one or more processors 1210, enable and cause the one or more processors 1210 to perform the method 1000 described with respect to FIG. 10, or any aspect related to it, including any additional operations described in relation to FIG. 10. Note that reference to a processor performing a function of communications device 1200 may include one or more processors performing that function of communications device 1200, such as in a distributed fashion.

In the depicted example, computer-readable medium/memory 1225 stores code for obtaining 1230 and code for sending 1235. Processing of the code 1230 and 1235 may enable and cause the communications device 1200 to perform the method 1000 described with respect to FIG. 10, or any aspect related to it.

The one or more processors 1210 include circuitry configured to implement (e.g., execute) the code stored in the computer-readable medium/memory 1225, including circuitry for obtaining 1215 and circuitry for sending 1220. Processing with circuitry 1215 and 1220 may enable and cause the communications device 1200 to perform the method 1000 described with respect to FIG. 10, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1245 and/or antenna 1250 of the communications device 1200 in FIG.

12, and/or one or more processors 1210 of the communications device 1200 in FIG. 12. Means for communicating, receiving or obtaining may include the transceivers 354, antenna(s) 352, receive processor 358, and/or controller/processor 380 of the UE 104 illustrated in FIG. 3, transceiver 1245 and/or antenna 1250 of the communications device 1200 in FIG. 12, and/or one or more processors 1210 of the communications device 1200 in FIG. 12.

FIG. 13 depicts aspects of an example communications device 1300. In some aspects, communications device 1300 is a network entity, such as BS 102 of FIGS. 1 and 3, or a disaggregated base station as discussed with respect to FIG. 2.

The communications device 1300 includes a processing system 1305 coupled to a transceiver 1345 (e.g., a transmitter and/or a receiver) and/or a network interface 1355. The transceiver 1345 is configured to transmit and receive signals for the communications device 1300 via an antenna 1350, such as the various signals as described herein. The network interface 1355 is configured to obtain and send signals for the communications device 1300 via communications link(s), such as a backhaul link, midhaul link, and/or fronthaul link as described herein, such as with respect to FIG. 2. The processing system 1305 may be configured to perform processing functions for the communications device 1300, including processing signals received and/or to be transmitted by the communications device 1300.

The processing system 1305 includes one or more processors 1310. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1325 via a bus 1340. In certain aspects, the computer-readable medium/memory 1325 is configured to store instructions (e.g., computer-executable code) that when executed by the one or more processors 1310, enable and cause the one or more processors 1310 to perform the method 1100 described with respect to FIG. 11, or any aspect related to it, including any additional operations described in relation to FIG. 11. Note that reference to a processor of communications device 1300 performing a function may include one or more processors of communications device 1300 performing that function, such as in a distributed fashion.

In the depicted example, the computer-readable medium/memory 1325 stores code for sending 1330 and code for obtaining 1335. Processing of the code 1330 and 1335 may enable and cause the communications device 1300 to perform the method 1100 described with respect to FIG. 11, or any aspect related to it.

The one or more processors 1310 include circuitry configured to implement (e.g., execute) the code stored in the computer-readable medium/memory 1325, including circuitry for sending 1315 and circuitry for obtaining 1320. Processing with circuitry 1315 and 1320 may enable and cause the communications device 1300 to perform the method 1100 described with respect to FIG. 11, or any aspect related to it.

More generally, means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 1345 and/or antenna 1350 of the communications device 1300 in FIG. 13, and/or one or more processors 1310 of the communications device 1300 in FIG. 13. Means for communicating, receiving or obtaining may include the transceivers 332, antenna(s) 334, receive processor 338, and/or controller/processor 340 of the BS 102 illustrated in FIG. 3, transceiver 1345 and/or antenna 1350 of the communications device 1300 in FIG. 13, and/or one or more processors 1310 of the communications device 1300 in FIG. 13.

Example Clauses

Implementation examples are described in the following numbered clauses:

Clause 1: A method for wireless communications by an apparatus comprising: obtaining a configuration indicating, for a type of port selection codebook associated with PMI feedback, one or more conditions applied to one or more ports among a plurality of ports associated with the PMI feedback; obtaining one or more first reference signals; and sending a first report based on the one or more first reference signals, the first report comprising the PMI feedback, the PMI feedback being in accordance with the configuration.

Clause 2: The method of Clause 1, wherein the one or more conditions include one or more first maximum allowed amplitude coefficients.

Clause 3: The method of Clause 2, wherein each of the one or more first maximum allowed amplitude coefficients define a peak amplitude that the apparatus is allowed to report for a port in the PMI feedback.

Clause 4: The method of Clause 2, wherein each of the one or more first maximum allowed amplitude coefficients is set to a value among a set of values for a maximum allowed amplitude, wherein the set of values include 0, $\sqrt{(1/4)}$, $\sqrt{(1/2)}$, and 1.

Clause 5: The method of Clause 2, wherein the configuration further indicates, for each of the one or more ports, a maximum allowed amplitude coefficient selected from the one or more first maximum allowed amplitude coefficients.

Clause 6: The method of Clause 2, wherein the configuration further indicates that the one or more first maximum allowed amplitude coefficients are specific to the type of port selection codebook.

Clause 7: The method of Clause 6, wherein the type of port selection codebook includes a Type-II port selection codebook, an enhanced Type-II port selection codebook, or a further enhanced Type-II port selection codebook.

Clause 8: The method of Clause 2, wherein the configuration further indicates that the one or more first maximum allowed amplitude coefficients are common to a plurality of MIMO layers.

Clause 9: The method of Clause 2, further comprising: obtaining an indication to report the PMI feedback in accordance with one or more second maximum allowed amplitude coefficients; obtaining one or more second reference signals; and sending a second report based on the one or more second reference signals according to a usage delay for the one or more second maximum allowed amplitude coefficients, the second report comprising the PMI feedback, the PMI feedback being in accordance with the one or more second maximum allowed amplitude coefficients.

Clause 10: The method of Clause 9, wherein the usage delay defines an earliest time of when the one or more second maximum allowed amplitude coefficients are to be applied to the PMI feedback, the earliest time being relative to when the indication to use one or more second maximum allowed amplitude coefficients is obtained.

Clause 11: The method of Clause 2, wherein each of the one or more ports is associated with a different spatial beam.

Clause 12: The method of Clause 2, wherein the one or more first maximum allowed amplitude coefficients depend on one or more of a carrier, a bandwidth part of the carrier, or a transmission time interval.

Clause 13: The method of any one of Clauses 1-12, wherein: the one or more conditions include one or more indications that the one or more ports are disabled for reporting in the PMI feedback; and the PMI feedback excludes precoding information associated with the one or more ports.

Clause 14: The method of any one of Clauses 1-13, wherein obtaining the configuration comprises obtaining the configuration via RRC signaling.

Clause 15: A method for wireless communications by an apparatus comprising: sending a configuration indicating, for a type of port selection codebook associated with PMI feedback, one or more conditions applied to one or more ports among a plurality of ports associated with the PMI feedback; sending one or more first reference signals; and obtaining a first report based on the one or more first reference signals, the first report comprising the PMI feedback, the PMI feedback being in accordance with the configuration.

Clause 16: The method of Clause 15, wherein the one or more conditions include one or more first maximum allowed amplitude coefficients.

Clause 17: The method of Clause 16, wherein each of the one or more first maximum allowed amplitude coefficients define a peak amplitude that a user equipment is allowed to report for a port in the PMI feedback.

Clause 18: The method of Clause 16, wherein each of the one or more first maximum allowed amplitude coefficients is set to a value among a set of values for a maximum allowed amplitude, wherein the set of values include 0, $\sqrt{(1/4)}$, $\sqrt{(1/2)}$, and 1.

Clause 19: The method of Clause 16, wherein the configuration further indicates, for each of the one or more ports, a maximum allowed amplitude coefficient selected from the one or more first maximum allowed amplitude coefficients.

Clause 20: The method of Clause 16, wherein the configuration further indicates that the one or more first maximum allowed amplitude coefficients are specific to the type of port selection codebook.

Clause 21: The method of Clause 20, wherein the type of port selection codebook includes a Type-II port selection codebook, an enhanced Type-II port selection codebook, or a further enhanced Type-II port selection codebook.

Clause 22: The method of Clause 16, wherein the configuration further indicates that the one or more first maximum allowed amplitude coefficients are common to a plurality of MIMO layers.

Clause 23: The method of Clause 16, further comprising: sending an indication to report the PMI feedback in accordance with one or more second maximum allowed amplitude coefficients; sending one or more second reference signals; and obtaining a second report based on the one or more second reference signals according to a usage delay for the one or more second maximum allowed amplitude coefficients, the second report comprising the PMI feedback, the PMI feedback being in accordance with the one or more second maximum allowed amplitude coefficients.

Clause 24: The method of Clause 23, wherein the usage delay defines an earliest time of when the one or more second maximum allowed amplitude coefficients are to be applied to the PMI feedback, the earliest time being relative to when the indication to use one or more second maximum allowed amplitude coefficients is obtained.

Clause 25: The method of Clause 16, wherein each of the one or more ports is associated with a different spatial beam.

Clause 26: The method of Clause 16, wherein the one or more first maximum allowed amplitude coefficients depend on one or more of a carrier, a bandwidth part of the carrier, or a transmission time interval.

Clause 27: The method of any one of Clauses 15-26, wherein: the one or more conditions include one or more indications that the one or more ports are disabled for reporting in the PMI feedback; and the PMI feedback excludes precoding information associated with the one or more ports.

Clause 28: The method of any one of Clauses 15-27, wherein sending the configuration comprises sending the configuration via RRC signaling.

Clause 29: One or more apparatuses, comprising: one or more memories comprising executable instructions; and one or more processors configured to execute the executable instructions and cause the one or more apparatuses to perform a method in accordance with any one of clauses 1-28.

Clause 30: One or more apparatuses, comprising means for performing a method in accordance with any one of clauses 1-28.

Clause 31: One or more non-transitory computer-readable media comprising executable instructions that, when executed by one or more processors of one or more apparatuses, cause the one or more apparatuses to perform a method in accordance with any one of clauses 1-28.

Clause 32: One or more computer program products embodied on one or more computer-readable storage media comprising code for performing a method in accordance with any one of clauses 1-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising:

one or more memories; and one or more processors coupled to the one or more memories, the one or more processors being configured to cause the apparatus to:

obtain a configuration indicating, for a type of port selection codebook associated with precoding matrix indicator (PMI) feedback, one or more conditions applied to one or more first ports among a plurality of ports associated with the PMI feedback, wherein the one or more conditions include one or more first maximum allowed amplitude coefficients;

obtain one or more first reference signals;

send a first report based on the one or more first reference signals, the first report comprising the PMI feedback, the PMI feedback being in accordance with the configuration;

obtain an indication to report the PMI feedback in accordance with one or more second maximum allowed amplitude coefficients; and send a second report according to a usage delay for the one or more second maximum allowed amplitude coefficients, wherein the usage delay defines an earliest time at which the one or more second maximum allowed amplitude coefficients are to be applied to the PMI feedback, the earliest time being relative to a time at which an indication to use the one or more second maximum allowed amplitude coefficients is communicated.

2. The apparatus of claim 1, wherein each of the one or more first maximum allowed amplitude coefficients define a peak amplitude that the apparatus is allowed to report for a port in the PMI feedback.

3. The apparatus of claim 1, wherein each of the one or more first maximum allowed amplitude coefficients is set to a value among a set of values for a maximum allowed amplitude, wherein the set of values include 0, $$\sqrt{\frac{1}{4}}, \sqrt{\frac{1}{2}},$$

and 1.

4. The apparatus of claim 1, wherein the configuration further indicates, for each of the one or more first ports, a maximum allowed amplitude coefficient selected from the one or more first maximum allowed amplitude coefficients.

5. The apparatus of claim 1, wherein the configuration further indicates that the one or more first maximum allowed amplitude coefficients are specific to the type of port selection codebook.

6. The apparatus of claim 5, wherein the type of port selection codebook includes a Type-II port selection codebook, an enhanced Type-II port selection codebook, or a further enhanced Type-II port selection codebook.

7. The apparatus of claim 1, wherein the one or more processors are configured to cause the apparatus to:
obtain one or more second reference signals; and
to send the second report, the one or more processors are configured to cause the apparatus to send the second report based on the one or more second reference signals.

8. The apparatus of claim 1, wherein each of the one or more first ports is associated with a different spatial beam.

9. The apparatus of claim 1, wherein the one or more first maximum allowed amplitude coefficients depend on one or more of a carrier, a bandwidth part of the carrier, or a transmission time interval.

10. The apparatus of claim 1, wherein:
the configuration includes one or more indications that one or more second ports among the plurality of ports are disabled for reporting in the PMI feedback; and
the PMI feedback excludes precoding information associated with the one or more second ports.

11. The apparatus of claim 1, wherein to obtain the configuration, the one or more processors are configured to cause the apparatus to obtain the configuration via radio resource control (RRC) signaling.

12. The apparatus of claim 1, wherein the one or more conditions include one or more first maximum allowed amplitude coefficients, and wherein the configuration further indicates that a first maximum allowed amplitude coefficient of the one or more first maximum allowed amplitude coefficients is common to a plurality of a multiple-input and multiple-output (MIMO) layers.

13. An apparatus configured for wireless communications, comprising:
one or more memories; and
one or more processors coupled to the one or more memories, the one or more processors being configured to cause the apparatus to:
send a configuration indicating, for a type of port selection codebook associated with precoding matrix indicator (PMI) feedback, one or more conditions applied to one or more first ports among a plurality of ports associated with the PMI feedback, wherein the one or more conditions include one or more first maximum allowed amplitude coefficients;
send one or more first reference signals;
obtain a first report based on the one or more first reference signals, the first report comprising the PMI feedback, the PMI feedback being in accordance with the configuration
send an indication to report the PMI feedback in accordance with one or more second maximum allowed amplitude coefficients; and
obtain a second report according to a usage delay for the one or more second maximum allowed amplitude coefficients, wherein the usage delay defines an earliest time at which the one or more second maximum allowed amplitude coefficients are to be applied to the PMI feedback, the earliest time being relative to a time at which an indication to use the one or more second maximum allowed amplitude coefficients is communicated.

14. The apparatus of claim 13, wherein each of the one or more first maximum allowed amplitude coefficients define a peak amplitude that a user equipment is allowed to report for a port in the PMI feedback.

15. The apparatus of claim 13, wherein each of the one or more first maximum allowed amplitude coefficients is set to a value among a set of values for a maximum allowed amplitude, wherein the set of values include 0, $$\sqrt{\frac{1}{4}}, \sqrt{\frac{1}{2}},$$

and 1.

16. The apparatus of claim 13, wherein the configuration further indicates, for each of the one or more first ports, a maximum allowed amplitude coefficient selected from the one or more first maximum allowed amplitude coefficients.

17. The apparatus of claim 13, wherein the configuration further indicates that the one or more first maximum allowed amplitude coefficients are specific to the type of port selection codebook.

18. The apparatus of claim 17, wherein the type of port selection codebook includes a Type-II port selection codebook, an enhanced Type-II port selection codebook, or a further enhanced Type-II port selection codebook.

19. The apparatus of claim 13, wherein the one or more processors are configured to cause the apparatus to:
send one or more second reference signals; and
to obtain the second report, the one or more processors are configured to cause the apparatus to obtain the second report after transmission of the one or more second reference signals.

20. The apparatus of claim 13, wherein each of the one or more first ports is associated with a different spatial beam.

21. The apparatus of claim 13, wherein the one or more first maximum allowed amplitude coefficients depend on one or more of a carrier, a bandwidth part of the carrier, or a transmission time interval.

22. The apparatus of claim 13, wherein:
the configuration includes one or more indications that one or more second ports among the plurality of ports are disabled for reporting in the PMI feedback; and
the PMI feedback excludes precoding information associated with the one or more second ports.

23. The apparatus of claim 13, wherein to send the configuration, the one or more processors are configured to cause the apparatus to send the configuration via radio resource control (RRC) signaling.

24. The apparatus of claim 13, wherein the one or more conditions include one or more first maximum allowed amplitude coefficients, and wherein the configuration further indicates that a first maximum allowed amplitude coefficient of the one or more first maximum allowed amplitude coefficients is common to a plurality of a multiple-input and multiple-output (MIMO) layers.

25. A method of wireless communications by an apparatus, comprising:
obtaining a configuration indicating, for a type of port selection codebook associated with precoding matrix indicator (PMI) feedback, one or more conditions applied to one or more ports among a plurality of ports associated with the PMI feedback, wherein the one or more conditions include one or more first maximum allowed amplitude coefficients;

obtaining one or more first reference signals;

sending a first report based on the one or more first reference signals, the first report comprising the PMI feedback, the PMI feedback being in accordance with the configuration;

obtaining an indication to report the PMI feedback in accordance with one or more second maximum allowed amplitude coefficients; and sending a second report according to a usage delay for the one or more second maximum allowed amplitude coefficients, wherein the usage delay defines an earliest time at which the one or more second maximum allowed amplitude coefficients are to be applied to the PMI feedback, the earliest time being relative to a time at which an indication to use the one or more second maximum allowed amplitude coefficients is communicated.

26. The method of claim 25, wherein the method comprises:

obtaining one or more second reference signals; and sending the second report based on the one or more second reference signals.

27. The method of claim 25, wherein the one or more conditions include one or more first maximum allowed amplitude coefficients, and wherein the configuration further indicates that a first maximum allowed amplitude coefficient of the one or more first maximum allowed amplitude coefficients is common to a plurality of a multiple-input and multiple-output (MIMO) layers.

28. A method of wireless communications by an apparatus, comprising:

sending a configuration indicating, for a type of port selection codebook associated with precoding matrix indicator (PMI) feedback, one or more conditions applied to one or more ports among a plurality of ports associated with the PMI feedback, wherein the one or more conditions include one or more first maximum allowed amplitude coefficients;

sending one or more first reference signals;

obtaining a first report based on the one or more first reference signals, the first report comprising the PMI feedback, the PMI feedback being in accordance with the configuration;

sending an indication to report the PMI feedback in accordance with one or more second maximum allowed amplitude coefficients; and obtaining a second report according to a usage delay for the one or more second maximum allowed amplitude coefficients, wherein the usage delay defines an earliest time at which the one or more second maximum allowed amplitude coefficients are to be applied to the PMI feedback, the earliest time being relative to a time at which an indication to use the one or more second maximum allowed amplitude coefficients is communicated.

29. The method of claim 28, wherein the method comprises:

sending one or more second reference signals; and obtaining the second report after sending the one or more second reference signals.

30. The method of claim 28, wherein the one or more conditions include one or more first maximum allowed amplitude coefficients, and wherein the configuration further indicates that a first maximum allowed amplitude coefficient of the one or more first maximum allowed amplitude coefficients is common to a plurality of a multiple-input and multiple-output (MIMO) layers.

* * * * *